Figure 1:
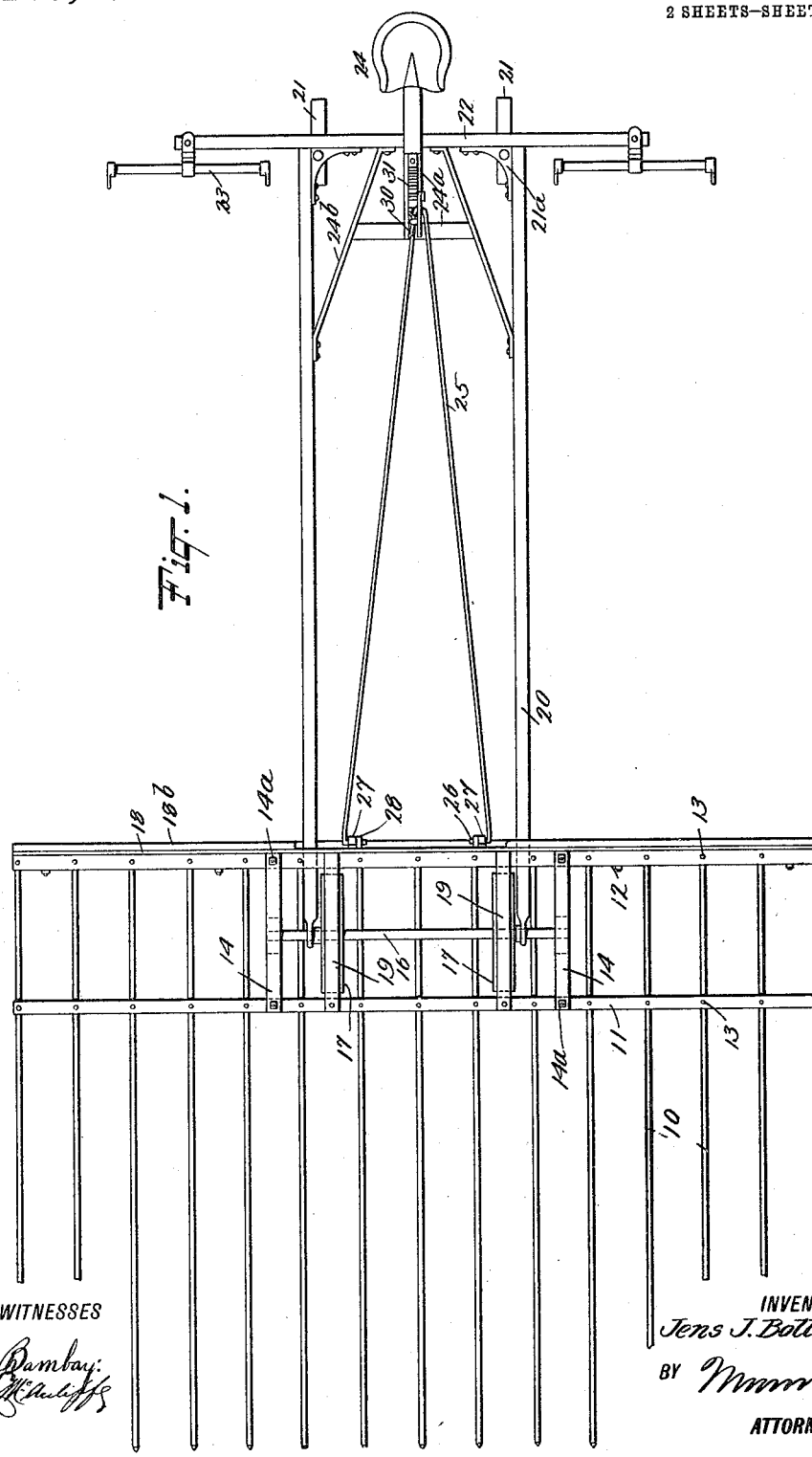

J. J. BOLLERUP.
SWEEP RAKE.
APPLICATION FILED JUNE 13, 1913.

1,127,171.

Patented Feb. 2, 1915.
2 SHEETS—SHEET 1.

WITNESSES

INVENTOR
Jens J. Bollerup
BY
ATTORNEYS

J. J. BOLLERUP.
SWEEP RAKE.
APPLICATION FILED JUNE 13, 1913.
1,127,171.
Patented Feb. 2, 1915.
2 SHEETS—SHEET 2.
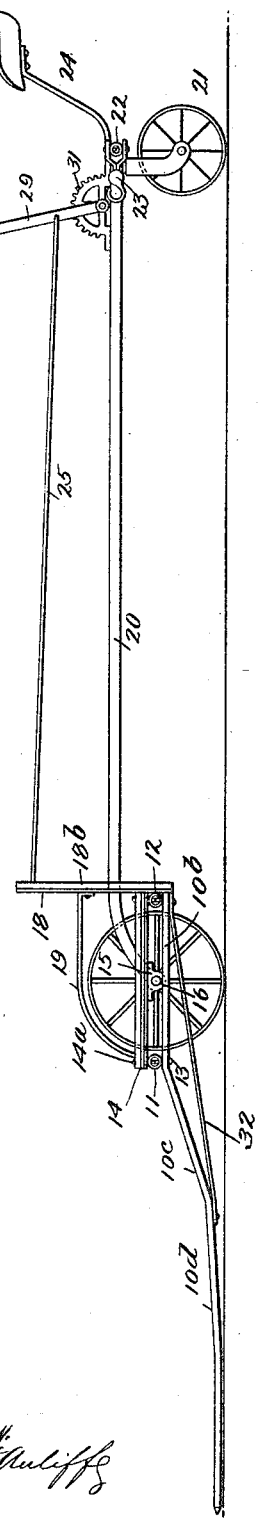
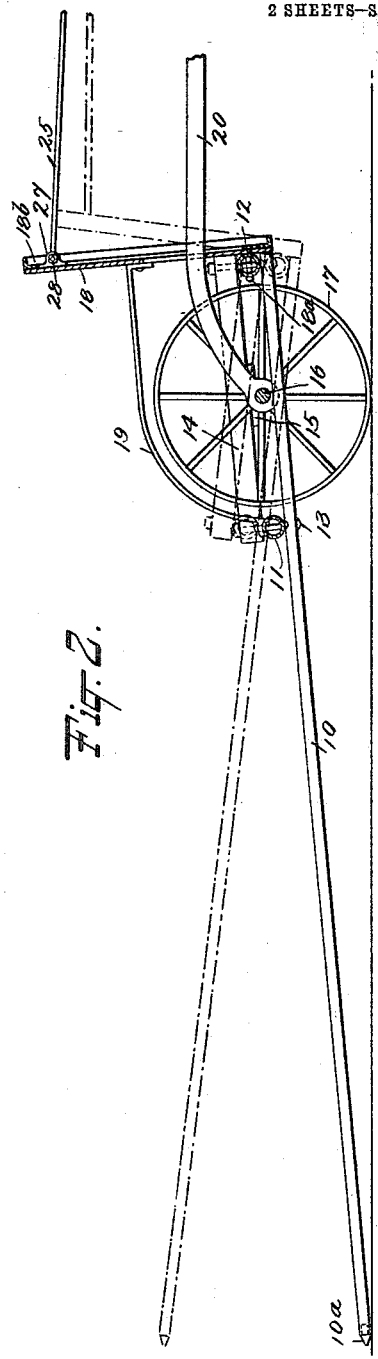
WITNESSES
INVENTOR
Jens J. Bollerup
BY Munn & Co
ATTORNEYS

UNITED STATES PATENT OFFICE.

JENS JENSEN BOLLERUP, OF LAKESIDE, NEBRASKA.

SWEEP-RAKE.

1,127,171. Specification of Letters Patent. Patented Feb. 2, 1915.

Application filed June 13, 1913. Serial No. 773,404.

*To all whom it may concern:*

Be it known that I, JENS J. BOLLERUP, a citizen of the United States, and a resident of Lakeside, in the county of Sheridan and State of Nebraska, have invented a new and Improved Sweep-Rake, of which the following is a full, clear, and exact description.

My invention relates to a sweep rake adapted to be propelled from the rear by draft horses hitched at the rear ends of the push bars.

It is an object of my invention to provide a rake of the indicated character having a simple construction, and in which teeth of a novel form are so arranged in connection with associated elements, as to constitute gathering tines at their forward ends, and constitute at their rear ends a carrying rack on which the running wheels are directly mounted.

My improved rake will be more particularly explained in the specific description following.

Reference is to be had to the accompanying drawings forming a part of this specification, in which similar characters of reference indicate corresponding parts in all the views.

Figure 1 is a plan view of a rake embodying my invention; Fig. 2 is a partially sectional side elevation thereof, on a somewhat larger scale; and Fig. 3 is a side elevation illustrating a modified form of rake teeth.

In constructing a rake in accordance with the illustrated example, rake teeth 10 are provided and formed preferably of gas pipe, the forward ends of each hollow tooth being closed by a pointed plug $10^a$ (Fig. 2). The teeth 10 are secured to a front cross bar 11 and a rear cross bar 12 by bolts 13, or equivalent means, the cross bar 12 being at the extreme rear ends of the teeth, or adjacent thereto, while the cross bar 11 is at a sufficiently forward point to accommodate the wheels, as hereinafter referred to.

Short longitudinally extending bars 14 are secured at their ends to the cross bars 11 and 12 by bolts $14^a$ or the like, and on the under side of the said bars 14, bearings 15 are provided for the axle 16 mounting running wheels 17.

At the rear ends of the teeth 10 is a shield 18, which is suitably secured in place by fastening it to the rear bars 12, bolts $18^a$ or their equivalent being employed for the purpose. The shield may be strengthened by an angle iron $18^b$ extending around the same, and connection is had between the shield and the front cross bar 11 by means of guards 19 located above the wheels 17. The shield is substantially perpendicular to the teeth and it rises above the wheels 17 a sufficient distance to arrest hay or grain gathered by the teeth 10 and passing rearwardly thereon.

To propel the rake, push bars 20 are provided, the forward ends being pivotally connected with the axle 16 to rock vertically relatively to said axle, and at the rear ends of the push bars a cross bar 22 is provided, carrying draft-trees 23, there being also caster wheels 21, which may be swiveled in angle irons $21^a$ secured to the push bars and to the cross bar 22. A seat 24 is suitably mounted, which may be supported on frame members $24^a$ and hounds or braces $24^b$.

Extending forwardly from a point adjacent to the seat are operating rods 25 for tilting the rake, said rods having their forward ends formed with lateral trunnions 26, that are received in brackets 27 on the shield 18, nuts 28 being employed on the trunnions to prevent displacement of the rods. At the rear end the rods 25, which may be formed integral with each other, are pivotally connected with a controlling lever 29 having a pawl 30 which is movable into engagement with the toothed sector 31.

It will be observed that by the described arrangement of the teeth, the cross bars 11 and 12, the axle-carrying bars 14, and the shield 18 with the guards or fenders 19, I provide a construction in which the forward ends of the teeth constitute gathering tines, while the rear ends thereof are utilized with the associated elements mentioned, to constitute a carrying rack which may tilt or rock vertically with the axle 16 as an axis. Thus a very simple and practical construction results and the teeth and rack as described may be tilted forwardly or rearwardly through the medium of the lever 29 acting through the rods 25, to dispose the rake teeth as in Fig. 2, with the front ends thereof adjacent to the ground, or with the tines and rack tilted to the position indicated in dotted lines in Fig. 2 for carrying the raked material to any particular point in the field. Furthermore, it is to be noted that by providing the longitudinally ranging bars above and connecting the front and rear cross bars and mounting the axle on the said longitudinal bars at the underside of the latter and above the tines, the result is obtained that the said cross bars may be spaced to accommodate large wheels for easier running and yet be strongly connected by the longitudinal bars; also the construction makes the axle entirely independent of the tines. Moreover this permits of any tine being readily renewed, or all of the tines changed to substitute a different form of tine for the particular work and the altering of the tines will not disturb the rigidity of the rack frame, consisting of the cross bars and longitudinal bars.

In the form shown in Fig. 3, the parts described are the same as in Figs. 1 and 2, with the exception that the teeth 10$^b$ instead of being straight, as in the first described construction are bent, being given a downward inclination from points adjacent to the front cross bar 11, as at 10$^c$, and then again slightly bent to give the front portions 10$^d$ of the tines less of a downward inclination than the intermediate portions 10$^c$. Diagonal braces 32 extend from the rear ends of the teeth to a point adjacent to the junction between the relatively inclined portions 10$^c$, 10$^d$. In practice I form the bars 11, 12, 14, 20 and 22 as well as the teeth 10, 10$^b$ of gas pipe. The result of thus forming and disposing the tines, is that the forward portions 10$^d$ thereof are brought more nearly parallel with the ground, which I have found insures the picking up of the material under different conditions, whereas with the plain straight tines, there is a greater tendency of the material to slip away from the steeper inclines of the tines. The accumulated material is nevertheless readily forced up the steeper short incline 10$^c$, to the rack formed by the cross bars, longitudinal bars and the rear horizontal portions 10$^b$ of the device.

Having thus described my invention, I claim as new and desire to secure by Letters Patent:

1. A sweep rake, comprising rake teeth, a rear cross bar secured to the several teeth at the rear ends thereof, a front cross bar spaced forwardly from the rear cross bar and secured to the teeth, longitudinally ranging bars secured to said cross bars, an axle carried by said longitudinal bars, at the under side of the latter, and supported on said longitudinal bars at the underside thereof independently of the teeth and above the latter; at an approximately equal distance from the cross bars, wheels on the axle, an upwardly extending shield ranging transversely at the rear of the teeth, guards above the wheels, said guards being secured at their rear ends to the shield and at their front ends to the front cross bar, push rods pivotally connected with the axle and extending rearwardly through the shield, means for supporting the rear ends of the push rods, a seat supported adjacent to the rear ends of the push rods, operating rods connected with the upper edge of the shield, and actuating means for operating said rods arranged adjacent to the seat; movements of said operating rods serving to tilt the rake teeth, shield, cross bars, and forwardly extending and longitudinal bars on the axle.

2. In a sweep rake, a rake head having tines and a carrying rack, a propelling frame, and means for tilting the rake head relatively to the said frame, the said carrying rack being composed of the rear portions of the tines, front and rear cross bars connecting the said portions of the tines, and a wheeled axle on the said carrying rack, the tines, in front of the rack having an intermediate portion at a downward inclination to the said rack, and at an inclination to the front ends of the tines.

3. A sweep rake, comprising a series of tines; a rigid rack frame, comprising spaced cross bars, to the under sides of each of which the rear ends of said tines are detachably secured, and longitudinally ranging bars connecting said cross bars; an axle secured to the said longitudinally ranging bars independently of the tines and above the latter; and running wheels on said axle between the cross bars.

In testimony whereof I have signed my name to this specification in the presence of two subscribing witnesses.

JENS JENSEN BOLLERUP.

Witnesses:
C. P. WAKEMAN,
D. L. STURGEON.